( 12 ) United States Patent
Wang et al.

(10) Patent No.: US 7,108,173 B1
(45) Date of Patent: Sep. 19, 2006

(54) METHOD, APPARATUS, AND SYSTEM FOR DISTRIBUTED MEETING SCHEDULING BASED ON AUTONOMOUS MULTI-AGENT

(75) Inventors: Zhihui Wang, Beijing (CN); Danjun Liu, Beijing (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/148,027

(22) PCT Filed: Sep. 30, 2000
(Under 37 CFR 1.47)

(86) PCT No.: PCT/CN00/00305

§ 371 (c)(1),
(2), (4) Date: Jan. 26, 2004

(87) PCT Pub. No.: WO02/29647

PCT Pub. Date: Apr. 11, 2002

(51) Int. Cl.
*G06K 7/10* (2006.01)

(52) U.S. Cl. ............... 235/377; 235/380; 235/383; 705/5; 705/6; 705/8; 705/9; 709/202; 709/219

(58) Field of Classification Search ............... 235/377, 235/380, 383; 705/5, 6, 8, 9; 700/99, 100; 340/572.1; 707/5, 104.1; 345/753, 963; 709/202, 219
See application file for complete search history.

(56) References Cited

U.S. PATENT DOCUMENTS

| | | | | | |
|---|---|---|---|---|---|
| 4,626,836 | A | * | 12/1986 | Curtis et al. ............... | 345/156 |
| 5,197,000 | A | * | 3/1993 | Vincent ........................ | 705/8 |
| 5,303,145 | A | | 4/1994 | Griffin et al. | |
| 5,528,745 | A | * | 6/1996 | King et al. ................. | 345/753 |
| 5,737,728 | A | * | 4/1998 | Sisley et al. ................. | 705/8 |
| 5,867,822 | A | * | 2/1999 | Sankar ........................ | 705/8 |
| 5,963,913 | A | * | 10/1999 | Henneuse et al. .............. | 705/9 |
| 5,974,406 | A | * | 10/1999 | Bisdikian et al. ............. | 707/1 |
| 6,009,333 | A | * | 12/1999 | Chaco ....................... | 455/456.5 |

(Continued)

FOREIGN PATENT DOCUMENTS

EP 0329911 A2 8/1989

(Continued)

OTHER PUBLICATIONS

Dent, L., Boticario, J., McDermott, J., Mitchell, T., and Zabowski, D., "*A Personal Learning Apprentice*", Proceedings of the Tenth National Conference on Artificial Intelligence, AAAI-92, San Jose, CA. pp. 96-103, 1992, no month.

(Continued)

*Primary Examiner*—Ahshik Kim
*Assistant Examiner*—Allyson N Trail
(74) *Attorney, Agent, or Firm*—Blakely, Sokoloff, Taylor & Zafman LLP

(57) ABSTRACT

According to one aspect of the invention, a method is provided in which a scheduling agent is assigned to each user in a system. Each scheduling agent is responsible for coordinating meeting activities for its associated user. Each user in the system is allowed to specify preferences for meeting scheduling based upon his corresponding calendar. In response to a meeting request initiated by one of the users, the scheduling agent for the meeting initiator and the scheduling agents for the attendees negotiate with each other to schedule the requested meeting at a most suitable time that is accepted by all attendees through their associated scheduling agents, based upon a set of scheduling criteria including the meeting timing information and the attendees preferences for meeting scheduling.

30 Claims, 5 Drawing Sheets

U.S. PATENT DOCUMENTS

| | | | |
|---|---|---|---|
| 6,035,278 A | | 3/2000 | Mansour |
| 6,085,098 A | * | 7/2000 | Moon et al. ................. 455/457 |
| 6,104,788 A | * | 8/2000 | Shaffer et al. ........... 379/93.17 |
| 6,134,548 A | * | 10/2000 | Gottsman et al. ............... 707/5 |
| 6,445,968 B1 | * | 9/2002 | Jalla ........................... 700/101 |
| 6,446,043 B1 | * | 9/2002 | Matsumoto et al. ........... 705/8 |
| 6,505,167 B1 | * | 1/2003 | Horvitz et al. ................. 705/9 |
| 2002/0035592 A1 | * | 3/2002 | Wu et al. .................. 709/202 |
| 2004/0172415 A1 | * | 9/2004 | Messina et al. .......... 707/104.1 |

FOREIGN PATENT DOCUMENTS

| | | |
|---|---|---|
| EP | 0142067 B1 | 7/1990 |

OTHER PUBLICATIONS

Kautz, H., Selman, B., Coen, M., Ketchpel, S., and Ramming, C. "*An Experiment in the Design of Software Agents*", Proceedings of the Twelfth National Conference on Artificial Intelligence, pp. 438-443, 1994, no month.

Kelley, J.F., Chapanis, A., "*How Professional Persons Keep Their Calendars: Implications for Computerization*", Journal of Occupational Psychology, 55:141-156, 1982, no month.

Maes, P., "*Agents that Reduce Work and Information Overload*", Communications of the ACM, vol. 37, No. 7, pp. 31-40, 146, ACM Press, Jul. 1994.

Nash, J., "*The Bargaining Problem*", Econometrica 18: 155-162, 1950, no month.

Nash, J., "*Two-Person Cooperative Games*", Econometrica 21: 128-140, 1953, no month.

Sugihara, K., Kikuno, T., Yoshida, N., "*A Meeting Scheduler for Office Automation*", IEEE Transactions on Software Engineering, 15 10: 1141-1146, Oct. 1989.

Taub, E., "*Sharing Schedules*", MacUser, 155-162, Jul. 1993.

Search Report for PCT/CN00/00305; mailed Dec. 21, 2000; 2 pages.

* cited by examiner

METHOD, APPARATUS, AND SYSTEM FOR DISTRIBUTED MEETING SCHEDULING BASED ON AUTONOMOUS MULTI-AGENT

FIELD OF THE INVENTION

The present invention relates to the field of computer processing. More specifically, the present invention relates to a method, apparatus, and system for distributed meeting scheduling based on autonomous multi-agent.

BACKGROUND OF THE INVENTION

In the current office environment, meetings have taken people a lot of time and energy. An executive will often spend a much larger percentage of his/her work time on meetings. Therefore the efficiency of the scheduling process used and the quality of the schedules generated affect the working of an organization to a large extent. Typically, the initiator of a meeting will have to negotiate with every attendee to arrange the meeting at such time that is acceptable to all the attendees in order to make sure that all attendees will be available to attend the meeting. Especially when a meeting has many attendees, the discourse of negotiation will often go on several rounds before reaching an agreement of the appropriate meeting time. Even when everyone involved in a meeting has available times to meet, the process for searching for a commonly available time, in the presence of communication delays (e.g., either through electronic mail or contacting by phone) and in the presence of other meetings being scheduled concurrently, can be frustrating and lead to less than satisfactory results.

Most of the commercially available software for scheduling over computer networks have been personal computer-based systems. Similarly, there have been a number of research projects that assist a human user in meeting scheduling process. However, there are severe drawbacks in the current commercial products and research systems. First, the scheduling discourse still needs user's interference. There are disadvantages with the user's interference: it takes a lot of the user's time and energy, and it can produce errors that might be introduced by human users due to the routine and tedious nature of the meeting schedule. Second, the scheduling activity is static. The dynamic nature of the users' calendars cannot be considered in time, which often leads to the failure of meeting scheduling. Third, there is a lack of privacy and security. The user must open his/her calendar to others, the necessary privacy cannot be guaranteed. The openness of the user's calendar also facilitates the malicious scheduling and attack. In addition, most current systems are the centralized ones in which the request for meeting scheduling must be sequenced and multiple meetings cannot be scheduled concurrently, which severely affects the throughput of the scheduling process.

BRIEF DESCRIPTION OF THE DRAWINGS

The features and advantages of the present invention will be more fully understood by reference to the accompanying drawings, in which.

DETAILED DESCRIPTION

Figure 1:
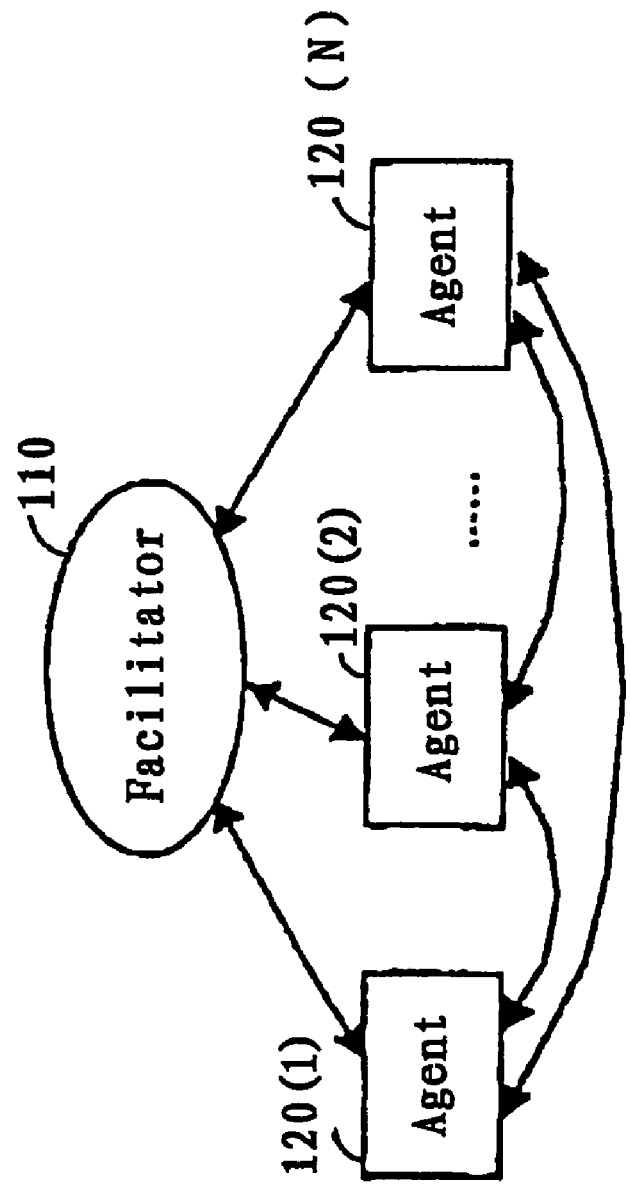
FIG. 1 is a block diagram of one embodiment of a system framework for distributed meeting scheduling according to the teachings of the present invention.

In the following detailed description numerous specific details are set forth in order to provide a thorough understanding of the present invention. However, it win be appreciated by one skilled in the art that the present invention may be understood and practiced without these specific details.

In the discussion below, the teachings of the present invention are utilized to implement a method, apparatus, system, and machine-readable medium for distributed meeting scheduling based on autonomous multi-agent. According to the teachings of the present invention, autonomous scheduling capabilities are provided through information exchange between intelligent meeting scheduling agents. In a meeting scheduling environment according to one embodiment, each user has one agent on acting on behalf of the user to take part in the negotiation of meeting scheduling according to the current dynamic user calendar. Not only that this configuration can save time and effort on the part of the human users, it also can lead to more efficient schedules and to changes in how information is exchanged within organizations. The distributed nature of the scheduling process allows for better throughput through concurrent negotiation on multiple meetings. Moreover, the user's preference(s) for the meeting scheduling are also taken into consideration. For example, when a meeting has several scheduling options, the agents will negotiate to reach an agreement of meeting scheduling based on all attendees' global preferences. In addition, since all meeting requests and calendar accesses are routed through the meeting scheduling agent, it can protect the privacy of its associated user while satisfying preferences of this individual. In one embodiment, a scheduling agent is assigned to each user in a system. Each scheduling agent is responsible for coordinating ands scheduling meeting activities for its associated user. In one embodiment, each user in the system may specify his/her preferences for meeting times and scheduling based upon his/her corresponding calendar. In one embodiment, in response to a meeting request initiated by one of the users, the scheduling agent for the meeting initiator and scheduling agents for the attendees negotiate with each other to schedule the requested meeting at a most suitable time that is accepted by all attendees through their corresponding scheduling agents, based upon a set of scheduling criteria including the meeting timing information and the attendees' preferences for meeting times. In one embodiment, the meeting timing information includes a set of possible start times for the requested meeting and an expected duration for the requested meeting. In one embodiment, each scheduling agent is assigned a network address and the addresses for the scheduling agents are maintained by a facilitator. Based upon the meeting timing information and the attendees' preferences, a list meeting suggestions is determined. Each meeting suggestion is assigned a relative score. A meeting suggestion with a higher score is considered more preferable than a meeting suggestion with a lower score. Based upon this list of meeting suggestions starting with the meeting suggestion that has the highest score, the scheduling agents will negotiate to obtain a consensus from all attendees with respect to a specific meeting suggestion until a consensus is obtained from all attendees or until all meeting suggestions have been exhausted. If a consensus can be obtained from all attendees for at least one meeting suggestion, a meeting notice is sent to the meeting initiator and the attendees. If a consensus cannot be obtained for any meeting suggestion, the meeting initiator is notified of a failure to schedule the requested meeting. In one embodiment, the list of meeting suggestions is determined as follows. Upon the initiation of the meeting request, a list of candidate suggestions is created based upon the meeting timing information. Each candidate suggestion includes a possible start time and the expected duration of the requested meeting. The list of candidate suggestions is then sent to the scheduling agents of the meeting attendees. The list of meeting suggestions is then formed based on the feedback received from the attendees' scheduling agents. The feedback received, in one embodiment, includes individual scores given to each candidate suggestion by the corresponding scheduling agents based upon the attendees' preferences. A list of optional suggestions is then formed by removing from the list of candidate suggestions those candidate suggestions that are not feasible based upon the feedback received from the attendees' scheduling agents. Each optional suggestion is assigned a corresponding global score based upon the individual scores given by the attendees' scheduling agents. The list of optional suggestions is then sorted in a specified order based upon the global score of each optional suggestion to form a list of reserving suggestions. Starting with the reserving suggestion that has the highest global score, a meeting scheduling negotiation process is performed to determine whether a particular reserving suggestion is acceptable to all meeting attendees. In one embodiment, the meeting scheduling process is performed as follows. The scheduling agent for the meeting initiator checks with the attendees' scheduling agents in a specified order to determine whether a particular reserving suggestion is acceptable to the attendees. If that particular reserving suggestion is acceptable to all attendees, then the requested meeting is scheduled according to the timing of that particular suggestion. If that particular reserving suggestion is not acceptable to any attendee, it is discarded and the meeting scheduling negotiation process is continued with the next reserving suggestion in the list.

FIG. 1 shows a block diagram of one embodiment of a system framework 100 according to the teachings of the present invention. As shown in FIG. 1, the system framework 100 includes a facilitator 110 and a set of scheduling agents 120(1–N) each of which acts on behalf of its associated user. In one embodiment, each individual or user in the organization is provided with an autonomous meeting scheduling agent 120. The network addresses of the agents 120 are registered with the facilitator 110. In one embodiment, when a user joins the organization, the corresponding agent 120 will register its network address with the facilitator automatically. Likewise, if the network address of a user's agent is changed, the corresponding agent 120 will request the facilitator 110 to update its address. If the user leaves, the agent 120 will request the facilitator to remove its network address. The inclusion of the facilitator 110 in the system framework 100 is very helpful to adapt the scalability and dynamics of the organization because the agents 120 can easily contact with each other through the addresses obtained from the facilitator 110.

In one embodiment, if a user wants to schedule a meeting with other users, he/she informs his/her associated agent of the meeting request. The agent gets the addresses of all the attendees' agents from facilitator, and then negotiates with the attendees' agents to determine whether the requested meeting can be scheduled successfully based on the preferences that are predefined by the users and the timing constraints specified by the meeting request. The scheduling discourse is asynchronous and autonomous. The scheduling result will be sent out by the agent acting on behalf of the initiator. In one embodiment, if the scheduling of the requested meeting is successful, the agent will send a meeting notice to all the attendees and the meeting initiator. If the scheduling fails, a notice of failure will be sent out only to the initiator. Under this condition, it is often that the constraint of the requested meeting is too strict to be met by all the attendees (e.g., the meeting time is constrained to only one option, 2:00–3:00 p.m, etc.). In this instance, the initiator can modify the meeting constraint and begin a new round of scheduling. According to the teachings of the present invention, multiple requests of meeting scheduling can be processed concurrently. Although the capability of concurrent scheduling makes the system more complicated, it allows high throughput and more efficiency in the meeting scheduling process.

Figure 2:
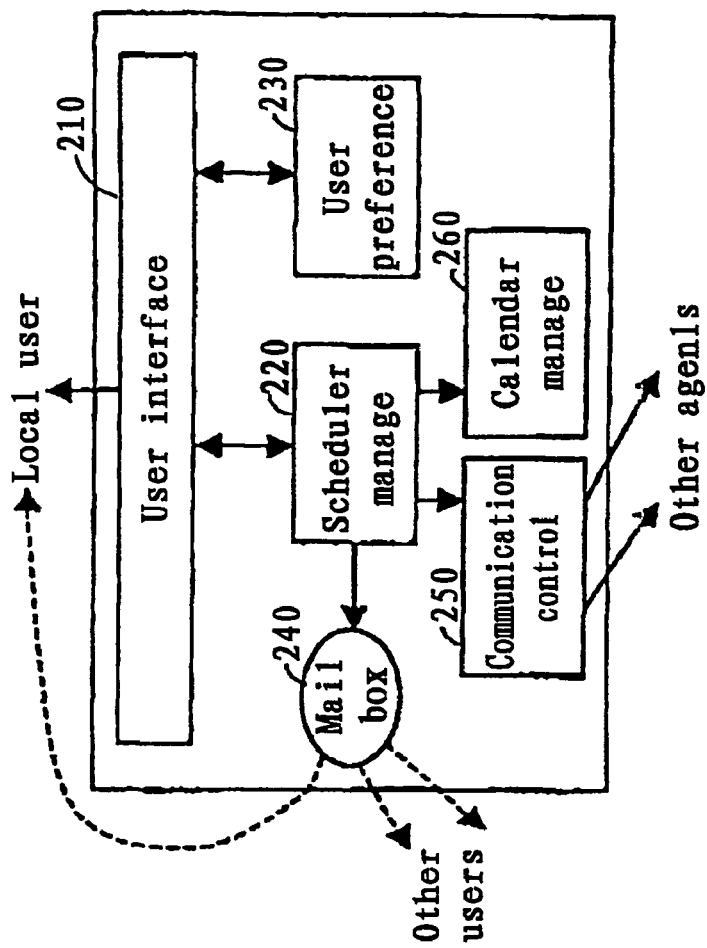
FIG. 2 is a block diagram of one embodiment of the architecture of a scheduling agent according to the teachings of the present invention.

FIG. 2 illustrates a block diagram of one embodiment of the architecture of the scheduling agents, according to the teachings of the present invention. As shown in FIG. 2, a scheduling agent includes a user interface 210, a scheduler manage unit 220, a user preference unit 230, a mailbox 240, a communication control unit 250, and a calendar manage unit 260. In the present embodiment, the scheduler manage 220 is considered the core unit or core module of the scheduling agent, which takes charge in the meeting scheduling activities for the user and negotiates with other agents on the basis of the user's dynamic calendar and preference. A user can utilize the user interface 210 to request the meetings, define or edit the meeting timing information and/or his/her preference for the meeting scheduling. In one embodiment, the information exchange between agents or between agent and facilitator is controlled by the communication control unit 250. In one embodiment, the user preference unit 230 is used to store the user preference(s) for the meeting scheduling based on his/her calendar. Calendar manage unit 260 records, among other things, the user's daily activities which include meetings with other users and his personal activities. In one embodiment, the result of the meeting scheduling will be sent to the users through the mailbox 240 in the manner of email. It should be appreciated and understood by one skilled in the art the agent's architecture shown in FIG. 2 is for illustration and explanation purposes and does not limit the scope of the present invention which includes other types of agent's architecture and configurations that may or may not have all the components or units shown in FIG. 2. Similarly, depending upon the specific implementations and/or applications of the present invention, the function(s) of the various units or components shown in FIG. 2 may be configured differently and each unit may perform its corresponding function in a different manner. For example, the result of meeting scheduling may be sent to the users in another form or manner (e.g., network broadcasting or other types of message communication, etc.).

The Global Preferences of Users

Meeting scheduling is a kind of social or business activity that involves multiple human users. Since the agents will act on behalf of the users to negotiate with each other to schedule meetings, it is important to integrate the users' preferences (e.g., preferences for meeting timing and scheduling) into the decision-making of the agent. However, different users may have different preferences for the meeting scheduling. Especially when there are many feasible suggestions for a meeting request, it is meaningful to schedule the meeting so that it will fit all the attendees' preferences. The following discussion explains how the meeting scheduler in accordance with the teachings of the present invention uses the user preferences to schedule meetings in a manner that will satisfy the user.

In a multi-agent model described herein, each user can express or specify his or her preferences over all the available time slots in the user's calendar. Through the associated agent, the user can predefine or modify his/her preferences over the time slots. In one embodiment, the preferences will be quantitated as a positive number and stored in the user preference unit or module of the corresponding agent. A user can express the preferences in the periodic way or just for a special day or time. For a time slot that has been occupied, the agent will update the user's preference for the respective time slot as zero. When the time slots that involve in a meeting suggestion are all free, the user's preference for a meeting suggestion will be the sum of the preference points for the individual timeslots divided by the duration of the meeting. If the meeting suggestion involves a busy timeslot (e.g., the user's preference for the timeslot has been updated as zero), the user's preference for the meeting suggestion will also be zero, which means that the suggestion is not an option.

In the discourse of multi-agent negotiation, the global preference will be emphasized for the meeting scheduling. However, when there are multiple options for a meeting, there is a question of how to decide or select the best one based on the global preference of users? A simple strategy is to select the one that has the maximal sum of preferences that the users define. But this solution cannot meet the different users' preferences for the following reasons. Suppose that user A and user B will be the attendees of a meeting and two options meeting time $T_1$ and $T_2$ are available. User A has a preference point 1 for $T_1$ and user B has a preference point 7 for $T_1$. However, user A has a preference point 3 for $T_2$ and user B has a preference point 4 for $T_2$. It is not correct to say that $T_1$ is more suitable or more preferable than $T_2$, although the sum of the preference points for $T_1$ is 8 which is larger than that for $T_2$. Actually, $T_2$ is more preferable under many conditions due to the nature of the meeting scheduling activity. The meeting scheduling is a negotiating activity, so it is more important to reach a consensus from different users with respect to the scheduling. In one embodiment, based on this reason, the outcome that maximizes the product of all the meeting attendees' preference points is chosen as the most suitable option for all meeting attendees. This approach guarantees a relatively fair distribution of the individual preferences and narrows the space of feasible consensus states.

The Solution for the Conflict for Concurrent Meeting Scheduling

The distributed meeting scheduling process described herein works in a asynchronous and distributed manner, and permits multiple meeting scheduling activities to be processed concurrently. Therefore it is possible that a user may act as the initiator and attendee, or as the attendee of different meetings at the same time. This brings more flexibility and higher throughput. But it also gives rise to the conflict of concurrent scheduling. The following example is used to explain this condition.

Figure 3:
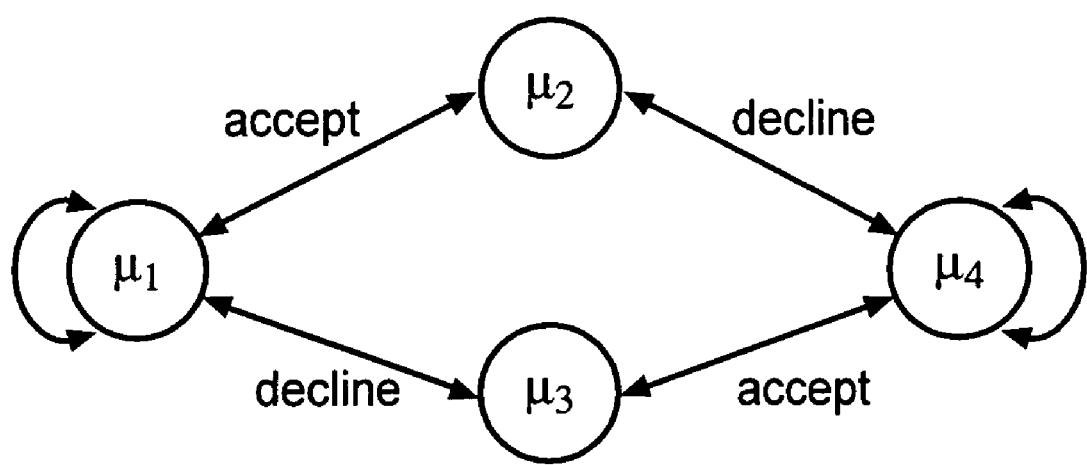
FIG. 3 shows an example of a conflict in concurrent scheduling.

Supposed that there are two meeting requests $M_1$ and $M_2$ initiated in the current scheduling environment. $M_1$ is initiated by user $u_1$, and attendees are user $u_1$, $u_2$, $u_3$ (note that the initiator of a meeting does not always attend the meeting. For example, a secretary can schedule meetings for his/her boss but may not be required to attend the meetings). $M_2$ initiated by user $u_4$, and $u_2$, $u_3$, $u_4$, are the attendees. The meeting times for both meetings are 2:00–3:00 p. m. on the same day. In this example, the associated agents are named after the users. Accordingly, the agent $u_1$ will send its request to agents $u_1$, $u_2$, $u_3$. At the same time agents $u_2$, $u_3$, $u_4$ may possibly get a request from agent $u_4$. It is therefore possible that the following conflict condition will take place as illustrated in FIG. 3.

Continuing with present discussion, it is assumed that the agent $u_2$ has accepted the request from agent $u_1$ and agent $u_3$ has accepted the request from agent $u_4$. Consequently, the agent $u_3$ win decline the request from agent $u_1$, and agent $u_2$ will decline the request from agent $u_4$. Thus neither of the two scheduling activities can be successful. In one embodiment, to avoid this conflict, a global order of the users is predefined (e.g., the alphabetical order of attendees' names). The agent of the meetings initiator will query the attendees' agents according to the predefined global order. In the present example, it is assumed that the global order of users is $u_1$, $u_2$, $u_3$, $u_4$. Then agent $u_1$ will send out the meeting request in the order of $u_1$, $u_2$, $u_3$ and agent $u_2$ will send out request in the order of $u_2$, $u_3$, $u_4$. For the two requests from the agents $u_1$ and $u_4$ respectively, the request that is first accepted by the agent $u_2$ will continue to be sent to the next attendee's agent, and the other request will be declined.

Figure 4:
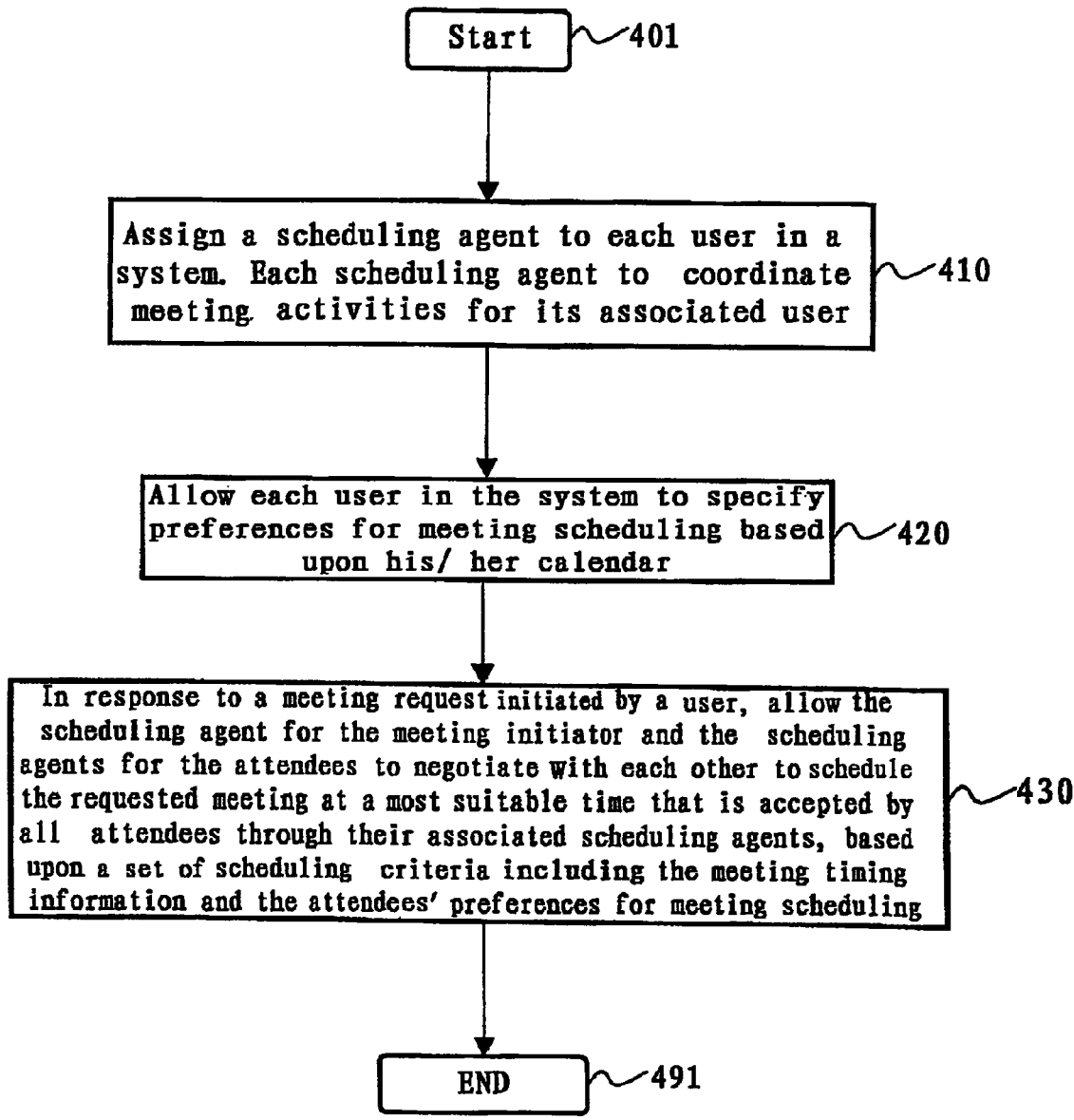
FIG. 4 is a flow diagram of one embodiment of a method according to the teachings of the present invention.

FIG. 4 shows a flow diagram of one embodiment of a method for distributed meeting scheduling according to the teachings of the present invention. At block 410, a sched uling agent is assigned to each user in a system. Each scheduling agent, as described above, is responsible for coordinating meeting activities for its associated user. At block 420, each user in the system is allowed to specify or express preferences for meeting scheduling based upon his/her calendar. At block 430, in response to a meeting request initiated by a user, the scheduling agent for the meeting initiator and the scheduling agents for the attendees negotiate with each other to schedule the requested meeting at a most suitable time that is accepted by all attendees through their associated agents, based upon a set of scheduling criteria including the meeting timing information and the attendees' preferences for meeting scheduling as described above.

Figure 5:
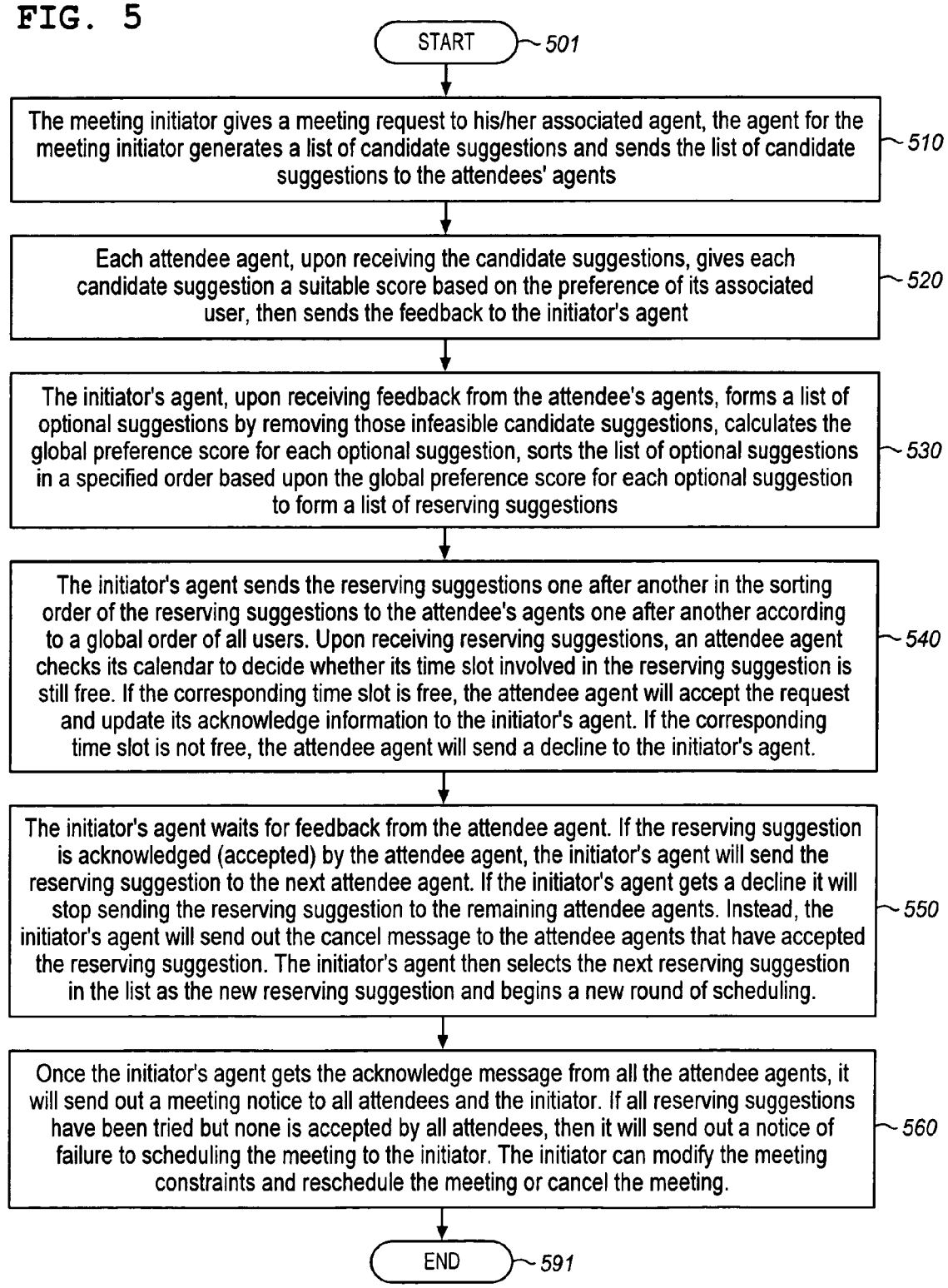
FIG. 5 is a flow diagram of one embodiment of a method according to the teachings of the present invention.

FIG. 5 shows a flow diagram of one embodiment of a process for meeting scheduling in accordance with the teachings of the present invention. The following discussion provides in details the scheduling process taken into consideration the global users' preferences and the conflict of concurrent scheduling as described above. First, the related formal description for meetings are described below. Given a typical meeting schedule environment, which consist a set of p users. A meeting request can be defined as:

$$R=(H,A,S,ST,L),$$

where:

H is the user who requests the meeting, called initiator. The associated agent of the meeting initiator is designated as the initiator agent ($AG_h$) for the requested meeting;

Al $U(U=\{1,2, \ldots , p\}$, is the set of users to attend the meeting, called attendees, the corresponding associated agents for the attendees are called attendee agents (A $G_i$, i∈A). It's possible that H∈A or not (H may or may not be one of the attendees). In one embodiment, if H∈A and |A|=1, it means that the initiator reserves the times for himself/herself on the calendar;

S is the subject of the requested meeting;

ST is a set of possible start times for the meeting;

L is the desired length that the meeting will last (also called the anticipated or expected duration for the meeting).

The following assumptions and definitions are also provided:

Candidate suggestions are the meeting suggestions that meet the requirements or constraints of the meeting request (R). These candidate suggestions are proposed by the initiator agent ($AG_h$) before the negotiation and can be described as a set of pair {t, L}, where t∈ST, is a possible start time for the meeting, L is the length that the meeting will last (also called anticipated or expected duration of the meeting);

Optional suggestions are a subset of the candidate suggestions which are feasible for all the meeting attendees (A). However, the optional suggestions have not been considered on the basis of the global users' preferences;

A reserving suggestion is one of the optional suggestions that is considered the most optimal or suitable suggestion at the present based on the above-discussed approach for the global users' preferences.

It is assumed that the calendar of the user is divided into some basic time slots (e.g., 30 minutes each).

The method illustrated in FIG. 5 works as follows:

At block 510: the initiator of the meeting H gives his/her associated agent (initiator agent, $AG_h$) the meeting request (R). $AG_h$ produces all the candidates suggestions and send them to all attendees' agents ($AG_i$, i∈A);

At block 520: each $AG_i$ that receives the candidate suggestions will give each candidate suggestion suitable points (also called score), based on the predefined preference of its associated user and then sends out the feedback to $AG_h$;

At block 530: when $AG_h$ gets all the feedback from all the $AG_i$, it forms a list of optional suggestions by removing those infeasible candidate suggestions. The initiator agent then calculates the global preference points (score) for each optional suggestion, sorts them in a list according to a specified order (e.g., descending order) of the global reference scores. This sorted list of optional suggestions based on the global reference scores is also called the list of reserving suggestions. The initiator agent then selects the first reserving suggestion in the list;

At block 540: the $AG_h$ will send the selected reserving suggestion to all the $AG_i$, one after another in the global order of all the users. After getting the selected reserving suggestion, $AG_i$ first checks its calendar to decide whether its time slot involved in the reserving suggestion is still free. If the time slot is free, it will accept the meeting request and update its calendar with the meeting, then send out the "acknowledge" (also called acceptance) information to $AG_h$. If the time slot is not free, it will send out "decline" to the $AG_h$;

At block 550: $AG_h$ waits for the feedback from the $AG_i$. If it gets the "acknowledge" from the $AG_i$, it will send the selected reserving suggestion to the next attendee agent in the global order of users. Once $AG_h$ gets a "decline" message (e.g., which may indicate that the previously available time of that attendee user is not available now), it will stop sending the selected reserving suggestion to the remaining attendee agents. Instead, $AG_h$ sends out a "cancel" message to the $AG_i$ who has accepted the reserving suggestion. $AG_h$ then selects the next one from the list of reserving suggestions (the sorted optional suggestions) as the new reserving suggestion and begins a new round of scheduling.

At block 560: when the $AG_h$ gets the acknowledge message from all the attendee agents (i.e., the selected reserving suggestion is accepted by all attendees), it sends out a meeting notice to all the attendees and the initiator. If the $AG_h$ has tried all the reserving suggestions but none is accepted by all attendees (e.g., it gets a decline message for each of the reserving suggestions), which indicates that there no longer available time slots that can meet the constraint of the meeting request R that is proposed by H. In this case, $AG_h$ will send out a notice of failure only to the initiator H. The initiator H can modify the meeting constraint and reschedule the meeting or just cancel the meeting.

The invention has been described in conjunction with the preferred embodiment. It is evident that numerous alternatives, modifications, variations and uses will be apparent to those skilled in the art in light of the foregoing description.

What is claimed is:

1. A method comprising:
assigning a scheduling agent to each user in a system, each scheduling agent being responsible for coordinating meeting activities for the scheduling agent's associated user;
allowing each user in the system to specify preferences for meeting scheduling based upon his corresponding calendar; and
in response to a meeting request initiated by one of the users, allowing the scheduling agent for the meeting initiator and the scheduling agents for the attendees to negotiate with each other to schedule the requested meeting at a most suitable time that is accepted by all attendees through their associated scheduling agents, based upon a set of scheduling criteria including the meeting timing information and the attendees' preferences for meeting scheduling;
wherein allowing the scheduling agents to negotiate includes the scheduling agent for the meeting initiator providing suggestions for meeting scheduling to the scheduling agents for the attendees and the scheduling agents for the attendees informing the scheduling agent for the meeting initiator which of the suggestions are acceptable to the attendees.

2. The method of claim 1 wherein the meeting timing information includes a set of possible start times for the meeting and an expected duration for the meeting.

3. The method of claim 1 wherein each scheduling agent is assigned a network address.

4. The method of claim 3 wherein the addresses for the scheduling agents are maintained by a facilitator.

5. The method of claim 4 wherein one scheduling agent gets the address for another agent from the facilitator.

6. The method of claim 1 wherein allowing the scheduling agents to negotiate further comprises:
determining, based upon the meeting timing information and the attendee's preferences for meeting scheduling, a list of meeting suggestions each being assigned a relative score, a meeting suggestion with a higher score being considered more preferable with respect to a meeting suggestion with a lower score; and
obtaining a consensus from all attendees with respect to a specific meeting suggestion starting with the meeting suggestion having the highest score until a consensus from all attendees is obtained or until all meeting suggestions have been exhausted.

7. The method of claim 6 further comprising:
sending a meeting notice to the meeting initiator and attendees if a consensus can be obtained from all attendees for at least one meeting suggestion.

8. The method of claim 6 further comprising:
notifying the meeting initiator of a failure to schedule the requested meeting if a consensus cannot be obtained for any meeting suggestion.

9. The method of claim 6 wherein determining the list of meeting suggestions comprises:
preparing a list of candidate suggestions based upon the meeting timing information, each candidate suggestion comprising a possible start time and the expected duration for the meeting;
sending the list of candidate suggestions to the attendees' scheduling agents; and
forming the list of meeting suggestions based upon feedback received from the attendees' scheduling agents, the feedback including individual scores given to each candidate suggestion by the corresponding scheduling agents based upon the attendees' preferences.

10. The method of claim 9 wherein forming the list comprises:
removing from the list of candidate suggestions those candidate suggestions that are not feasible based upon the feedback received to form a list of optional suggestions, each optional suggestion being assigned a corresponding global score based upon the individual scores given by the attendees' scheduling agents; and
sorting the list of optional suggestions in a specified order based upon the global score of each optional suggestion to form a list of reserving suggestions.

11. The method of claim 10 obtaining the consensus comprises:
performing a meeting scheduling negotiation process to determine whether a particular reserving suggestion is acceptable to all meeting attendees, starting with the reserving suggestion having the highest global score, comprising:
checking with the attendees' scheduling agents in a specified order to determine whether the particular reserving suggestion is acceptable to the attendees;
if the particular reserving suggestion is acceptable to all attendees, scheduling the requested meeting according to the particular reserving suggestion; and
if the current reserving suggestion is not acceptable to any attendee, discarding the particular reserving suggestion in process and continuing the meeting scheduling negotiation process with the next reserving suggestion.

12. The method of claim 11 wherein checking with the attendees' scheduling agents comprises:
sending the particular reserving suggestion to an attendee's scheduling agent in the specified order starting with the scheduling agent that is listed first in the specified order;
getting feedback from the corresponding scheduling agent; and
if the corresponding scheduling agent indicates that the particular reserving suggestion is acceptable, sending the particular reserving suggestion to the next attendee's scheduling agent in the specified order.

13. The method of claim 12 wherein the particular reserving suggestion is not sent to the remaining attendee scheduling agents if the particular reserving suggestion is declined by the corresponding scheduling agent.

14. A meeting scheduling agent comprising:
logic to manage a user's calendar including available time slots for meetings, the logic to manage the user's calendar including logic to allow the user to express the user's preferences for available time slots in the user's calendar; and
logic to manage meeting scheduling activities for the user, comprising:
logic to perform a meeting scheduling negotiation process with scheduling agents for meeting attendees by providing a meeting request initiated by the user to the scheduling agents for the meeting attendees, the meeting request including suggestions for possible meeting times;
logic to determine the most suitable time for the meeting that is accepted by the scheduling agents for the meeting attendees based upon a set of criteria including the meeting timing information and the attendee's preferences for meeting times.

15. The meeting scheduling agent of claim 14 wherein the meeting timing information comprises information indicating at least one possible start time for the meeting and an anticipated duration for the meeting.

16. The meeting scheduling agent of claim 15 wherein logic to determine comprises:
   logic to determine, based upon the meeting timing information and the attendee's preferences for meeting times, a list of meeting suggestions each having a relative score, a meeting suggestion with a higher score being considered more preferable relative to a meeting suggestion with a lower score; and
   logic to obtain a consensus from all the attendees with respect to a specific meeting suggestion starting with the meeting suggestion that has the highest score until a consensus is obtained or all meeting suggestions have been exhausted.

17. The meeting scheduling agent of claim 16 wherein logic to construct the list of meeting suggestions comprises:
   logic to prepare a list of candidate suggestions based upon the meeting timing information, each candidate suggestion comprising a possible start time and the anticipated duration for the meeting;
   logic to communicate the list of candidate suggestions to the attendee's scheduling agents; and
   logic to form the list of meeting suggestions based upon feedback received from the attendees' scheduling agents, the feedback including individual scores given to each candidate suggestion by the corresponding scheduling agents based upon the corresponding attendees' preferences.

18. The meeting scheduling agent of claim 17 wherein the logic to form the list of meeting suggestions comprising:
   logic to remove the candidate suggestions that are not feasible from the list of candidate suggestions to form a list of optional suggestions, each optional suggestion being assigned a global score based upon the individual scores given by the attendees' scheduling agents; and
   logic to sort the list of optional suggestions in a specified order based upon the global score of each optional suggestion to form a list of reserving suggestions.

19. The meeting scheduling agent of claim 18 wherein the logic to perform the meeting scheduling negotiation process further comprises:
   logic to determine whether a current reserving suggestion is acceptable to all meeting attendees starting with the reserving suggestion that has the highest global score, comprising:
      logic to check with the attendees' agents in a specified order to determine whether the current reserving suggestion is acceptable to the attendees;
      if the current reserving suggestion is acceptable to all attendees, scheduling the requested meeting according to the current reserving suggestion; and
      if the current reserving suggestion is not acceptable to any attendee, discarding the current reserving suggestion and continuing the meeting scheduling negotiation process with the next reserving suggestion.

20. The meeting scheduling agent of claim 18 wherein logic to check comprises:
   logic to send the current reserving suggestion to the attendees' agents in a sequential manner according to the specified order and to wait for the acceptance of the reserving suggestion from the current agent before sending the current reserving suggestion to the next agent in the specified order.

21. The meeting scheduling agent of claim 20 wherein the current reserving suggestion is not sent to the remaining attendee agents if the current reserving suggestion is declined by the current attendee agent.

22. A system comprising:
   a plurality of scheduling agents each being associated with a corresponding user, each scheduling agent to coordinate meeting activities for the associated user and comprising:
      logic to manage a user's calendar including available time slots for meetings, the logic to manage the user's calendar including logic to allow user to express the user's preferences for available time slots in the user's calendar; and
      logic to manage meeting scheduling activities for the user, comprising:
         logic to perform a meeting scheduling negotiation process with scheduling agents for meeting attendees by providing a meeting request initiated by the user to the scheduling agents for the meeting attendees, the meeting request including suggestions for possible meeting times;
         logic to determine, in response to a meeting request initiated by the user, the most suitable time for the meeting that is accepted by the scheduling agents for the meeting attendees based upon a set of criteria including the meeting timing information and the attendee's preferences for meeting times.

23. The system of claims 22 wherein the meeting timing information comprises information indicating at least one possible start time for the meeting and an anticipated duration for the meeting.

24. The system of claim 23 wherein logic to determine comprises:
   logic to determine, based upon the meeting timing information and the attendee's preferences for meeting times, a list of meeting suggestions each having a relative score, a meeting suggestion with a higher score being considered more preferable relative to a meeting suggestion with a lower score; and
   logic to obtain a consensus from all attendees with respect to a specific meeting suggestion starting with the meeting suggestion that has the highest score until a consensus is obtained or all meeting suggestions have been exhausted.

25. The system of claim 24 wherein logic to determine the list of meeting suggestions comprises:
   logic to prepare a list of candidate suggestions based upon the meeting timing information, each candidate suggestion comprising a possible start time and the anticipated duration for the meeting;
   logic to communicate the list of candidate suggestions to the attendee's scheduling agents; and
   logic to form the list of meeting suggestions based upon feedback received from the attendee's scheduling agents, the feedback including individual scores given to each candidate suggestion by the corresponding scheduling agents based upon the corresponding attendees' preferences.

26. The system of claim 22 further comprising:
   a facilitator to maintain network addresses for the scheduling agents, the scheduling agents to get the network addresses for other scheduling agents from the facilitator.

27. A machine-readable medium comprising instructions which, when executed by a machine, cause the machine to perform operations comprising:

assigning a scheduling agent to each user in a system, each respective scheduling agent being responsible for coordinating meeting activities for the corresponding user;

allowing each user in the system to specify preferences for meeting times based upon his corresponding calendar; and in response to a meeting request initiated by one of the users, allowing the scheduling agents for the attendees and the scheduling agent for the meeting initiator to negotiate with each other schedule the requested meeting at a most suitable time that is accepted by all attendees through their corresponding scheduling agents, based upon a set of scheduling criteria including the meeting timing information and the attendees' preferences for meeting times;

wherein allowing the scheduling agents to negotiate includes the scheduling agent for the meeting initiator providing suggestions for meeting scheduling to the scheduling agents for the attendees and the scheduling agents for the attendees informing the scheduling agent for the meeting initiator which of the suggestions are acceptable to the attendees.

28. The machine-readable medium of claim 27 wherein the meeting timing information includes a set of possible start times for the meeting and an expected duration for the meeting.

29. The machine-readable medium of claim 28 wherein allowing the scheduling agents to negotiate further comprises:

determining, based upon the meeting timing information and the attendee's preferences for meeting times, a list of meeting suggestions each being assigned a relative score, a meeting suggestion with a higher score being considered more preferable with respect to a meeting suggestion with a lower score; and obtaining a consensus from all attendees with respect to a specific meeting suggestion starting with the meeting suggestion having the highest score until a consensus from all attendees is obtained or until all meeting suggestions have been exhausted.

30. The machine-readable medium of claim 29 wherein determining the list of meeting suggestions comprises:

preparing a list of candidate suggestions based upon the meeting timing information, each candidate suggestion comprising a possible start time and the expected duration for the meeting;

sending the list of candidate suggestions to the attendees' scheduling agents;

forming the list of meeting suggestions based upon feedback received from the attendees' scheduling agents, the feedback including individual scores given to each candidate suggestions by the corresponding scheduling agents based upon the attendees' preferences;

removing from the list of candidate suggestions those candidate suggestions that are not feasible based upon the feedback received to form a list of optional suggestions, each optional suggestion being assigned a corresponding global score based upon the individual scores given by the attendees' scheduling agents; and sorting the list of optional suggestions in a specified order based upon the global score of each optional suggestion to form a list of reserving suggestions.

\* \* \* \* \*